March 26, 1963 H. M. ZENOR 3,082,943
PREPARATION OF SYNTHETIC GRAVITY MAPS
Filed April 21, 1958 5 Sheets-Sheet 1

INVENTOR.
Hughes M. Zenor
BY
Adams, Forward and McLean
ATTORNEYS

March 26, 1963 H. M. ZENOR 3,082,943
PREPARATION OF SYNTHETIC GRAVITY MAPS
Filed April 21, 1958 5 Sheets-Sheet 2

INVENTOR.
Hughes M. Zenor
BY
Adams, Forward and McLean
ATTORNEYS

INVENTOR.
Hughes M. Zenor

March 26, 1963  H. M. ZENOR  3,082,943
PREPARATION OF SYNTHETIC GRAVITY MAPS
Filed April 21, 1958  5 Sheets-Sheet 5

INVENTOR.
Hughes M. Zenor
BY
Adams, Forward and McLean
ATTORNEYS

United States Patent Office 3,082,943
Patented Mar. 26, 1963

3,082,943
PREPARATION OF SYNTHETIC GRAVITY MAPS
Hughes M. Zenor, Tulsa, Okla., assignor, by mesne assignments, to Sinclair Research, Inc., New York, N.Y., a corporation of Delaware
Filed Apr. 21, 1958, Ser. No. 729,937
1 Claim. (Cl. 235—61)

My invention relates to the investigation of the geological structure of the earth and in particular provides a method and apparatus useful in construction of synthetic gravity maps.

For any map of observed gravity measurements there is no single unique distribution of the subsurface densities. However, with a knowledge of the geology of the area, a limited number of possible distributions can be assumed. For each of these anticipated subsurface density distributions, a synthetic gravity map can be made. If the synthetic map correlates with the observed gravity map, it may be assumed that the subsurface density distribution is the same as that assumed for the calculation of the synthetic map. If the synthetic map and the observed map are not the same, the assumed subsurface distribution may be modified to improve the similarity. By this procedure a possible subsurface distribution is decided upon.

Since no unique subsurface solution is available from the observed gravimeter readings, this synthetic map represents only a possible solution. If the geology of the area justifies, additional subsurface distributions can be assumed, and these, in turn, can be the basis for the determination of synthetic maps. This analysis requires extensive calculations which are laborious and expensive, making desirable the use of computing aids.

It is a principal object of my invention to provide a method, and an apparatus useful in connection with such method, which will reduce the number of mathematical calculations necessary in preparing such synthetic gravity maps by providing information directly and simply leading to synthetic gravity data by a few simple mechanical operations.

In particular I contemplate considering the assumed geological structure in the area of interest as a series of layers of incremental thickness and prepare a series of charts, one such chart representing each such layer, on which I mark contour lines to indicate the assumed density distribution in each such layer. Each chart is thus divided by the contour lines into two or more areas representing portions of the layer having approximately uniform densities. I then measure the solid angle subtended by each such area from a point which corresponds (on the same scale as the chart in question) to a station on the surface of the earth at which a gravity measurement is to be indicated on a synthetic gravity map of the area of interest. The effect of the assumed subsurface density distribution upon gravity measured at such station is then simply a summation of the information so obtained, in each case the solid angle measurement must be multiplied by its scale factor, that is, the factor by which a measurement on the chart must be multiplied in order to obtain the actual measurement. Each solid angle measurement must also be multiplied by the density of the area subtending the angle and by the incremental thickness represented by the chart in question. The same procedure using the same charts is then repeated as desired for different stations on the surface of the earth as these may be desired in construction of the synthetic gravity map based on the assumed subsurface density distribution.

The apparatus of my invention is particularly useful in carrying out the process in that it provides a device which by simple manipulation can be used to measure the solid angle subtended by the uniform density areas. Broadly speaking, the apparatus of my invention contemplates employing a curve follower, that is, a device having a table or the like for receiving a chart made on a flat piece of paper or other sheet material and a pointer or scanning device for tracing a curve on the chart. The particular curve follower which I employ must trace the displacement of the curve from a preselected axis which, relative to the chart on which the curve is traced, represents a vertical line from the particular station on the surface of the earth at which a gravity measurement is desired. Thus, the curve follower as it traces the curve rotates about the axis. The curve follower is connected to and drives a device which produces an output, either mechanical or electrical, responsive to the position of the curve follower at any instant and in proportion to one minus the cosine of the plane angle generated by the preselected axis and a line from the point corresponding to the station at which the gravity measurement is to be made to the point on the curve then traced by the curve follower. The curve follower is also connected to and drives a second device which has an output, either mechanical or electrical, which is responsive to the angular movement of the curve follower rotating about the axis. As will be shown later the two outputs when integrated yield the solid angle of any area enclosed by the curve traced by the curve follower measured from the point corresponding to the surface station.

Thus, in a more refined apparatus in accordance with my invention, I also provide a computer for accomplishing such integration and which also can be set to introduce the density represented by the particular area traced, the incremental thickness of such area and the scale factor.

For a more complete understanding of the principles of my invention reference is made to the appended drawings which illustrate several practical applications of the apparatus of my invention and further explain the theory on which my method is based. In the drawings.

Referring to FIGURES 1–4 the reference numeral 20 designates broadly an apparatus for carrying out my invention which includes a flat bed 21 positioned horizontally and on which is mounted an upright post 22 which is provided with a lengthwise flat 23. Bed 21 is generally rectangular in shape and is centrally inscribed with a series of equally spaced guide lines 24 parallel to two opposite sides of bed 21 and a perpendicular intersecting series of similarly spaced parallel guide lines 25 parallel to the other opposite sides of bed 21. Post 22 is positioned centrally along one side of bed 21 with flat 23 facing outwardly.

A horizontal platform 26 is positioned across and spaced above bed 21 slidably received at one end on post 22 through an aperture 26a which is flatted at its outer end to key platform 26 axially relative to post 22 by engaging flat 23 on post 22. A set screw 28 is provided in platform 26 to engage flat 23 and permit adjustable positioning of platform 26 vertically on post 22.

Near its end platform 26 remote from post 22 carries a suspended telescopic pointer 27 which is mounted by two devices to platform 26 the first of which, designated generally by the reference numeral 29, functions to develop a mechanical movement proportional to one minus the cosine of the angle which pointer 27 makes with the vertical, and the other, of which, device 30, functions to measure the angle of rotation pointer 27 makes about a vertical axis.

Figure 2:
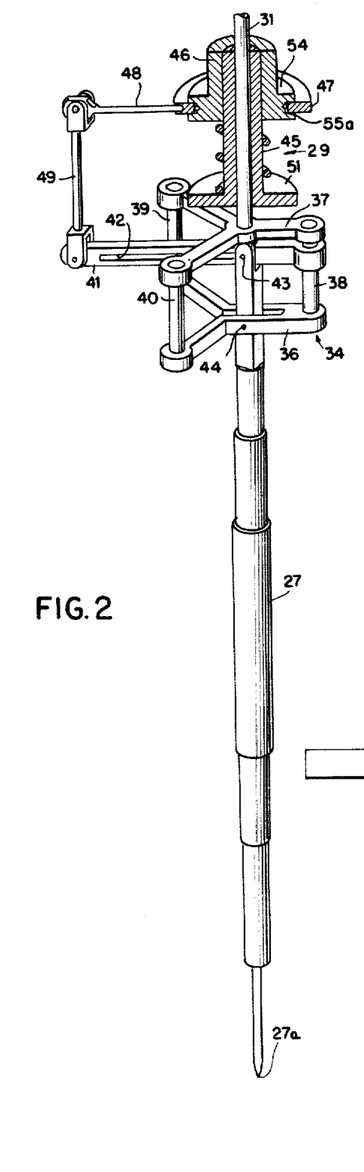
FIGURE 2 is an enlarged perspective view of a portion of the apparatus shown in FIGURE 1.
Figure 3:
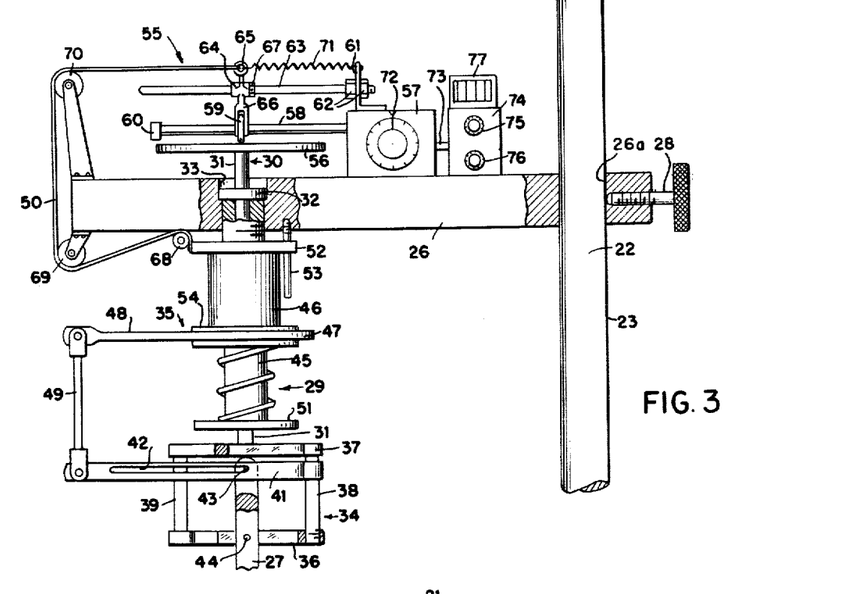
FIGURE 3 is an enlarged fragmentary elevation of another portion of the apparatus shown in FIGURE 1.
Figure 4:
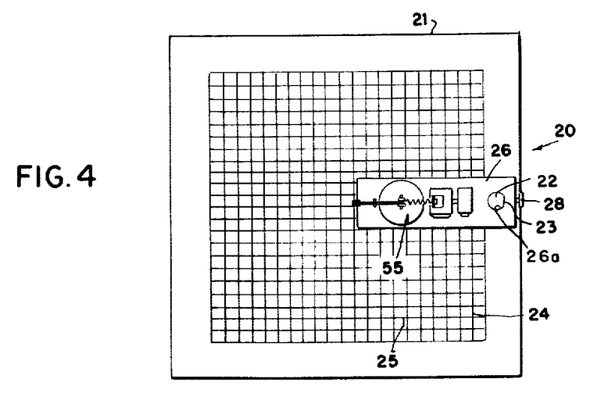
FIGURE 4 is a plan view of the apparatus shown in FIGURE 1.

Device 29 is more completely shown in FIGURES 2 and 3 and is supported by device 30 which includes simply a vertical shaft 31 mounted in a thrust bearing 32 positional in an aperture 33 extending vertically through platform 26. Device 29 broadly includes a frame 34 affixed to the lower end of shaft 31 beneath platform 26 and a linkage 35 in part positioned about shaft 31 between frame 34 and the underside of platform 26.

Frame 34 includes a lower Y-shaped bracket 36, an upper Y-shaped bracket 37 and three vertical pins 38, 39, 40. Y brackets 36 and 37 are aligned vertically and held in fixed horizontal positions spaced from each other by pins 38, 39, 40, pin 38 being affixed at its ends in the leg ends of Y brackets 36, 37 and pins 39, 40 being affixed at their ends in corresponding arm ends of Y brackets 36, 37. Pin 38 is provided with a longitudinal slot extending lengthwise of pin 38 and carries a slide arm 41 which is keyed to and receives pin 38 and which extends horizontally from pin 38 between brackets 36, 37 and centrally between pins 39, 40 and which terminates beyond frame 34. Arm 41 is provided with a central slot 42 which extends lengthwise of arm 41 and horizontally through arm 41.

Bracket 37 is affixed at its center to the lower end of shaft 31, and bracket 36 is slotted vertically from the juncture of its arms through its leg portion toward pin 38. Pointer 27 at its upper end is bifurcate receiving opposite sides of arm 41 and is provided with a pin 43 through its bifurcate end which extends through slot 42, thus permitting the upper end of pointer 27 to slide lengthwise of arm 41 along slot 42. Slot 42 is terminated at its end proximate to pin 38 such that sliding movement of the upper end of pointer 27 terminates in a direction toward pin 38 vertically aligned with shaft 31. A short distance below its upper end pointer 27 is received in the slot in the leg portion of a bracket 36 and is supported in such position by a pivot pin 44 supported at its ends in bracket 36 and extending centrally through pointer 27. The location of pin 44 is such that when pin 43 limits movement of the upper end of pointer 27 toward pin 38 pointer 27 hangs vertically aligned with shaft 31.

It will thus be apparent that pivoting of pointer 27 above pivot pin 44 carrying the upper end of pointer 27 away from slide pin 38 will, by the engagement of pin 43 in slot 42 cause slide arm 41 to slide downwardly on pin 38. As will be shown later the vertical position of arm 41 relative to its uppermost position is proportional to one minus the cosine of the angle pointer 27 makes with the vertical. Also, it will be evident that since shaft 31 is mounted in a bearing 32 permitting rotation of shaft 31 about a vertical axis frame 34 can revolve permitting pointer 27 to point towards any portion of bed 21. It will also be noted that pointer 27 is indicated in the drawings as consisting of a number of sections, thus permitting it to extend with telescopic movement such that within any range of vertical adjustment of the position of platform 26 on post 22 the lower tip 27a of pointer 27 can be brought into contact with any portion of the upper surface of bed 21.

The linear movement in the vertical direction of arm 41 is carried to the computer elements located on the upper side of platform 26 by linkage 35. Linkage 35 basically includes a tube 45, a sleeve 46, a slide ring 47 having a horizontally projecting arm 48, a vertical link rod 49 and a cable 50. Tube 45 is coaxially and slidably positioned over the lower portion of shaft 31 and at its upper end it threadedly engages in the lower portion of bore 33. The lower end of tube 45 terminates in a radial flange 51 just above the lower end of shaft 31 and upper bracket 37 of frame 34. Tube 45, thus is maintained in fixed position while shaft 31 can rotate within tube 45.

Sleeve 46 is shorter than tube 45 and is coaxially positioned slidably over tube 45 beneath platform 26. The upper end of sleeve 46 is provided with a radial flange 52 which is provided with a vertical aperture slidably receiving a vertical rod 53 engaged in and projecting downwardly from the under side of platform 26, thus permitting sleeve 46 to slide vertically without angular movement relative to tube 45. The lower end of sleeve 46 is also provided with a radial flange 54 which is peripherally grooved, as indicated by the reference numeral 55a (see FIGURE 2), to receive slide ring 47. A weak helical spring is positioned coaxially about tube 45 between flange 51 and the underside of flange 54 under just sufficient compression to carry the weight of sleeve 46.

Arm 48 on slide ring extends outwardly in a radial direction from slide ring 47 and at its outer end, located immediately above the outer end of slide arm 41, is connected to the outer end of slide arm 41 by link rod 49. It will be thus apparent that vertical movement of slide arm 41 responsive to changes in angular position of pointer 27 with respect to the vertical causes a corresponding vertical movement of sleeve 46. On the other hand, rotation of pointer 27 about its vertical axis while causing identical rotation of shaft 31, slide arm 41, link 49, arm 48 and slide ring 47 does not produce rotation of sleeve 46.

On top of platform 26 directly over shaft 31 there is located a wheel and disk integrator 55 (see particularly FIGURES 1, 3 and 4), including a disk 56 affixed at its center to the upper end of shaft 31 where the latter projects above the upper surface of platform 26. A variable speed gear box 57 is positioned on the upper side of platform 26 having an input, splined shaft 58 extending horizontally above the upper surface of disk 56. Shaft 58 is thus equi-distant from disk 56 which is also horizontal and is also positioned such that it crosses a diameter of disk 56. Shaft 58 carries a rubber wheel 59 which is keyed to the splines of shaft 58 such that rotation of wheel 59 which frictionally engages the upper surface of disk 56 causes rotation of input shaft 58 to variable speed gear box 57. At its end remote from gear box 57 just short of the rim of disk 56 splined shaft 58 is provided with a collar 60 which prevents wheel 59 from being carried out of engagement with disk 56.

An angle bracket 61 mounted on the top of gear box 57 supports, by means of a pair of locked nuts 62, a slide rod 63 which extends horizontally directly above splined shaft 58. A sleeve 64 is slidably positioned on the portion of rod 63 remote from angle bracket 61 and carries an eye ring 65 supported above it and a fork or trunnion 66 supported below it. Trunnion 66 is positioned about wheel 59 such that sliding movement of sleeve 64 along rod 63 carries wheel 59 radially out from the center of disk 56 along spline shaft 58. A collar 67 is positioned near the center of rod 63 to prevent wheel 59 being guided past the center of disk 56 away from collar 60.

Cable 50 which is secured at one end to flange 52 on sleeve 46 is connected at its other end to eye ring 65 passing free running sheaves 68, 69, 70. Sheave 68 is supported on the underside of platform 26 such that the end of cable 50 attached to flange 52 leaves sheave 68 on a vertical tangent. Sheave 69 is positioned on the underside of platform 26 projecting beyond the edge of platform 26 to carry cable 50 from sheave 68 around the edge of platform 26. Sheave 70 is similarly positioned vertically aligned above sheave 69 on the upper surface of platform 26 to carry the end of cable 50 attached to eye ring 65 on a horizontal tangent. Thus the vertical position of slide arm 41 determines the horizontal position of wheel 59.

A coil spring 71 attached at one end to angle bracket 61 and at the other end to eye ring 65 places continuous tension on cable 50 to assure that the radial movements of wheel 59 on disk 56 are at all times exactly equal to vertical movements of slide arm 41. It will also be noted that when pointer 27 is in a vertical position wheel 59 rides dead on the center of disk 56.

Variable speed gear box 57 in a conventional manner is provided with a control knob 72 for adjusting the rate of rotation of output shaft 73 to that of splined input shaft 58. Output shaft 73 in turn is connected as the input shaft to a second variable speed gear box 74 provided with two speed control knobs 75 and 76 and which drives a conventional indicator wheel counting device 77.

Figure 5:
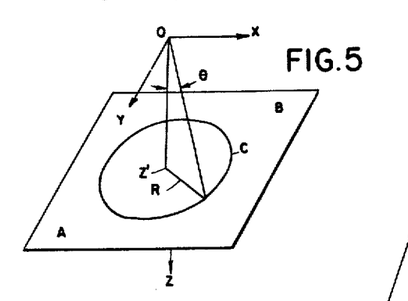
FIGURE 5 is a diagram illustrating in part the theory on which my method is based.
Figure 6:
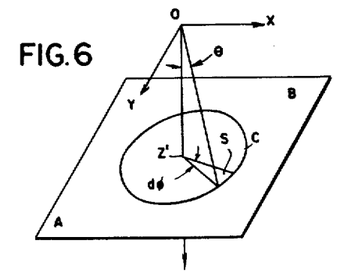
FIGURE 6 is a view similar to FIGURE 5.

Before discussing the operation of device 20, a brief review of the theoretical considerations involved is in order. Assume a coordinate system such that the XY plane is on the surface of the earth and the Z axis increases downwardly as shown in FIGURE 5 and in which the Z axis is intersected by a plane AB parallel to the X and Y axes at a point $z'$. If on plane AB a circle C is drawn with a radius R concentric with the Z axis, the area of circle C will subtend at the origin O of the coordinate system a solid angle $$\Omega = 2\pi(1-\cos \theta) \quad (1)$$

where $\Omega$ is the solid angle, and $\theta$ is the plane angle at O subtended by radius R. If a segment S of circle C is drawn as shown in FIGURE 6, the solid angle $d\Omega$ subtended at the origin O of the coordinate system by segment S will be $$d\Omega = d\phi(1-\cos \theta) \quad (2)$$

where $d\phi$ is the angle of circle C occupied by segment S, which if integrated will give $\Omega=2\pi(1-\cos \theta)$.

Figure 7:
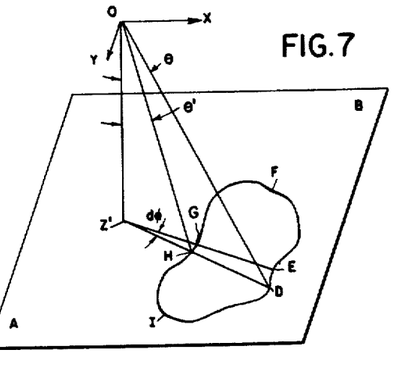
FIGURE 7 is another diagram further explaining my invention.
Figure 8:
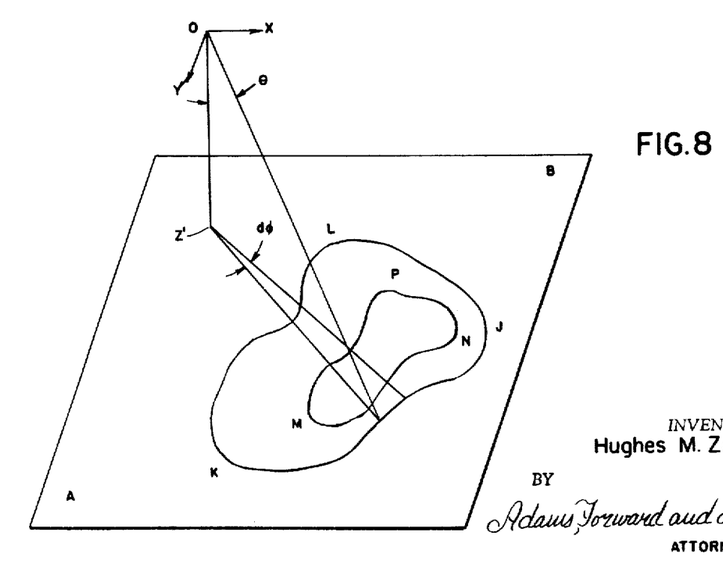
FIGURE 8 is still a further diagrammatic view explaining the theory of operation.

If in the same coordinate system, as shown in FIGURE 7, an irregular type of curve DEFGHI is drawn on plane AB, the solid angle $\Omega$ subtended at O will be $$\Omega = \int_0^{2\pi}(1-\cos \theta)d\phi \quad (3)$$

where the integration is a line integral performed around the periphery of the area DEFGHI. The solid angle subtended by the area of $z'$DE will be $$d\Omega = (1-\cos \theta)d\phi \quad (4)$$

and by the area of $z'$GH will be $$d\Omega = (1-\cos \theta')d\phi \quad (5)$$

where $\theta'$ is the plane angle subtended at O by the line $z'$H. Thus the solid angle $\Omega$ will automatically be obtained if the integration is performed in a counterclockwise fashion around the periphery of DEFGHI since the $d\phi$ corresponding to HG will be negative and the $d\phi$ corresponding to DE will be positive. Thus the solid angle obtained by the area within curve DEFGHI in FIGURE 7 can be obtained by Equation 3. In general, however, the solid angle subtended by areas similar to that shown in FIGURE 8 will be required. Thus, FIGURE 8 illustrates the same coordinate system with plane AB containing a first irregularly shaped closed curve JKL and a second irregularly shaped closed curve MNP contained entirely within curve JKL. The area under consideration is that defined between the two curves. The solid angle of the area between the two curves in FIGURE 8 is easily obtained by performing the integration suggested in Equation 3 provided the integration around line JKL is performed counterclockwise and the integration around line MNP is performed clockwise. The solid angle subtended by the area enclosed by the two contours can therefore be obtained.

In a practical application of the method of my invention the assumed geologic structure of the subsurface of the area in interest is divided as indicated above into a series of contiguous layers usually lying in horizontal planes and having incremental thickness chosen sufficiently small as will be later shown desirable to obviate differences due to sloping interfaces between beds. A series of charts suitably marked on paper are then prepared indicating for each layer the contour lines between areas in the layer having differing densities. These lines are in effect contour lines and will in normal circumstances have the appearance shown in FIGURE 8 only with greater complexity. Each such chart one at a time is then placed on the upper surface of bed 21 using guide lines 24, 25 accurately to locate the chart with respect to the pivot point 44 of pointer 27 which represents on the scale of the chart the location of a surface station at which a gravity measurement is to be made. Set screw 28 is, of course, loosened and platform 26 adjusted vertically to obtain the correct vertical scale position of point 44, after which set screw 28 is then tightened to fix platform 26 in position.

The first contour line on the chart enclosing an area which is to be assessed for its effect on gravity at the reference station is then selected. The density of the area within this contour line is noted. Indicator dial 72 of variable speed gear box 57 is set such that the ratio of the rate of rotation of output shaft 73 to that of input shaft 58 corresponds to the density of the selected area or more properly speaking to the difference between the density and normal density within the subsurface of the area of interest. Control knob 75 of variable speed gear box 74 is then set to provide a gear multiplication equal to the incremental thickness of the selected layer represented on the chart, and control knob 76 is set to introduce a gear multiplication equal to the scale factor of the chart. Wheel indicator 77 is set to zero.

Pointer tip 27a is then extended outwardly without rotation of shaft 31 to the initial point on the contour to be traced and carefully traced around the contour in a counter-clockwise direction. It will be noted that the direction of tracing the contour is determined by whether the density of the area under question is above or below the pre-selected average density. Thus, if counterclockwise rotation about the area produces a positive indication at indicator 77 and the density of the area under question is below normal, a clockwise rotation tracing the contour line enclosing the area is called for. This procedure is repeated for each area within the chart without resetting indicator 77 (if indicator 77 has to be reset because of inability to commence tracing one contour at the same radius with respect to the vertical axis after the preceding contour trace was completed, the total indication should be noted and when the new trace is commenced the indicator should be reset to zero).

The remaining charts of the subsurface of the area of interest are traced in a similar manner making appropriate adjustments of the height of platform 26 as required. It will be noted that as the layers approach the surface small sized charts are normally employed since the effect of subsurface formations close to the surface and at a steep angle with the vertical from the reference station become of less interest. Similarly, as the subsurface is explored at greater depth, larger areas are required. In order that uniform chart sizes can be used to take advantage of the full area of bed 21, it may be desirable to adjust the scale factor and hence control knob 76 may require adjustment from time to time. Similarly, the incremental thickness may be desirably varied, and adjustment of knob 75 therefore may be required.

Figure 1:
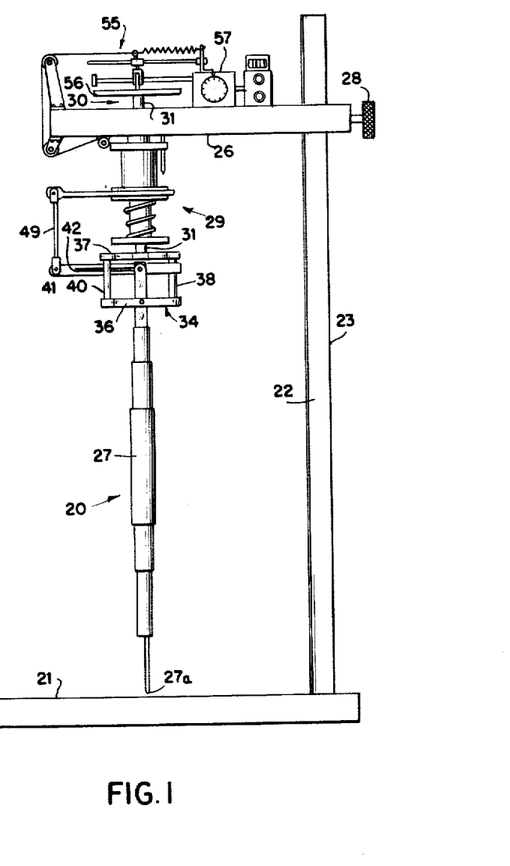
FIGURE 1 is an elevation of an apparatus constructed in accordance with my invention.
Figure 9:
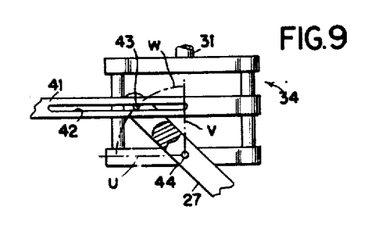
FIGURE 9 is a fragmentary, diagrammatic view of a portion of the apparatus shown in FIGURES 1–4 illustrating the function of that portion.

That the operation of device 20 measures a true solid angle can be readily seen, referring more particularly to FIGURE 9, which shows a fragmentary sketch of the action between frame 34, pointer 27 and slide arm 41. Shown in broken lines is a vertical line V coinciding with the axis of rotation of shaft 31 and a horizontal line U coinciding with the plane of rotation of pointer 27. Broken line W indicates the arcuate path of slide pin 43 along slot 42 in slide arm 41. The angle which pointer 27 makes with the vertical is evidently equal to the angle between broken line V and a line drawn between pins 43 and 44. The cosine of this angle, if the length of line V between intersection with line W and point 44 is assumed as a unit, is evidently the vertical height of pin 43 above line U, and hence one minus the cosine of the angle is clearly the distance from the intersection of lines W and V along line V to the point at which line V intersects a horizontal plane through pin 43. Hence, the movement of slide arm 41 downwardly from its maximum upper position illustrated in FIGURES 1, 2 and 3 is proportional to 1—cos $\theta$. This movement is clearly transferred to wheel 59, which moves outwardly from the center of disk 56 the same proportionate distance. Since $d\theta$ is introduced to wheel and disk integrator 55 by rotation of disk 56 the integration of Equation 3 is accomplished by wheel and disk integrator 55 as pointer 27 is traced around each contour.

Figure 10:
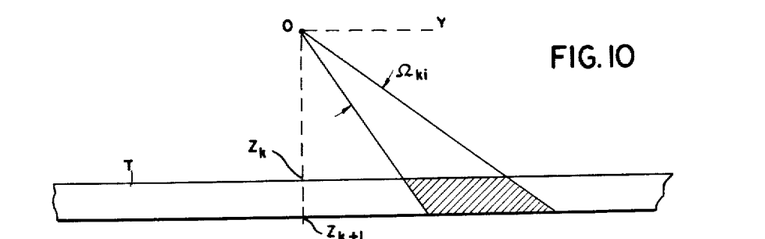
FIGURE 10 is still another diagram further explaining the theoretical considerations underlying my invention.

FIGURE 10 represents a vertical section through the Y axis of a coordinate system such as shown in FIGURES 5–8 intersecting a horizontal layer T chosen in an assumed subsurface structure where the origin O of the coordinate system represents the location of a surface station at which a gravity measurement is to be made. Layer T in actuality is bounded by an upper plane at a depth of $Z_K$ and a lower plane at a depth of $Z_{K+1}$. The shaded portion of layer T subtending a solid angle $\Omega_{Ki}$. The contribution to the gravity reading at the origin O of such shaded portion will be $$\Delta G_{Ki} = K \sigma_{Ki} (Z_{K+1} - Z_K)_i \Omega_{Ki} \qquad (6)$$

where K is a constant of proportionality (scale factor) and $\sigma_{Ki}$ is the density of the shaded portion. The contribution to the gravity reading $\Delta G_K$ for the entire layer between plane $Z_K$ and plane $Z_{K+1}$ will be $$\Delta G_K = K (Z_{K+1} - Z_K) \sum_{i=1}^{n} \sigma_{Ki} \Omega_{Ki} \qquad (7)$$

where the layer is assumed to have $n$ areas differing in density. The contribution to the gravimeter reading $\Delta G$ from all the layers and the subsurface considered in the area of interest will be $$\Delta G = K \sum_{K=1}^{m} (Z_{K+1} - Z_K) \sum_{i=1}^{n} \sigma_{Ki} \Omega_{Ki} \qquad (8)$$

where the area of interest has been reduced to $m$ layers (the choice of $\Delta G$ instead of G has been made since interest normally will be only in that structure which differs from the normal. Also in practice the $\sigma_{Ki}$ used would be the density contrast rather than the true density with the values being positive if the density is greater than normal and negative if less than normal).

Figure 11:
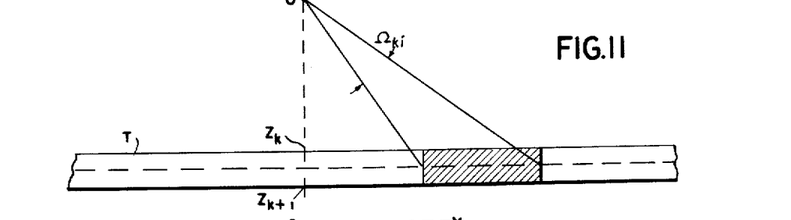
FIGURE 11 is a view similar to FIGURE 10.

Since the contours on the various sheets of paper will form areas of density contrast bounded by vertical lines as shown in FIGURE 11 rather than as shown in FIGURE 10 a true value of the area will be more nearly obtained if the distance from the sheet of paper to pivot 44 is selected, such that it corresponds to the distance from the surface gravity meter located at origin O placed a distance above the chart equivalent to the average between depths $Z_K$ and $Z_{K+1}$ i.e., $$Z = \frac{Z_K + Z_{K+1}}{2} \qquad (9)$$

where Z equals the corresponding distance from point 44 to the sheet of paper.

Figures 12, 13:
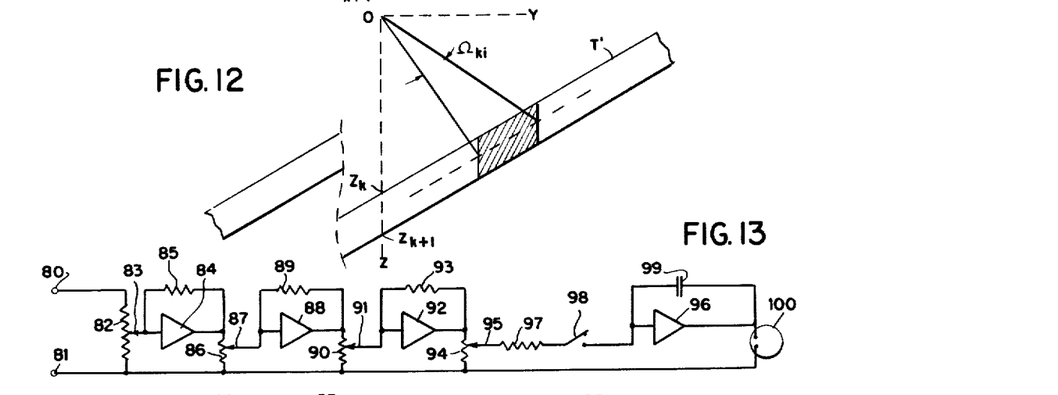
FIGURE 12 is yet another diagram illustrating the underlying theory.
FIGURE 13 is a schematic diagram of an electrical computer for obtaining the desired gravity information.

It is not necessary that the layers T be horizontal. Thus, the contribution to gravity can be obtained from sloping layers provided that bed 21 of device 20 is tilted to the angle of the sloping subsurface structure and the vertical thickness $Z_{K+1} - Z_K$ is used as in Equation 8. The effect of this computation is illustrated in FIGURE 12 which shows a sloping subsurface layer T' with the sloping upper plane of layer T' intersecting the Z axis at $Z_K$ with a sloping lower surface plane intersecting the Z axis at $Z_{K+1}$. It will be seen that by adjustment of the height of pin 44 above the surface of the chart according to Equation 9 the solid angle $\Omega_{Ki}$ subtended by the shaded portion of layer T' is measured on the tilted bed 21 in the same manner as the solid angle measured in FIGURE 11.

If the beds vary appreciably in thickness due to thinness in sections, the value of $(Z_{K+1} - Z_K) \sigma_{Ki}$ can be contoured instead of $\sigma_{Ki}$ only, and Equation 8 will become $$\Delta G = K \sum_{K=1}^{m} \sum_{i=1}^{n} [(Z_{K+1} - Z_K)_i \sigma_{Ki}] \Omega_{Ki} \qquad (10)$$

Combining with Equation 3, Equation 10 becomes $$\Delta G = K \sum_{K=1}^{m} \sum_{i=1}^{n} [(Z_{K+1} - Z_K)_i \sigma_{Ki}] \int_0^{2\pi} (1 - \cos \theta) d\phi \qquad (11)$$

In the apparatus shown in FIGURES 1–4 the entire computation was performed by mechanical devices. It will be apparent that electrical devices can be substituted; thus, FIGURE 13 shows in simplified form a schematic diagram of a suitable electrical circuit for performing the computation.

In FIGURE 13 input terminals 80, 81 are connected to a suitable source of voltage-stabilized, direct current. A potentiometer 82 is connected across terminals 80 and 81, the latter terminal being the common ground of the circuit. The variable position wiper contact 83 of potentiometer 82 is connected as the input to a high gain D.C. amplifier 84. A feedback resistor 85 is connected from the output to the input of amplifier 84 to control the gain of amplifier 84. The position of wiper contact 83 in the computer shown in FIGURE 13 is manually set to introduce the scale factor K.

The output voltage of amplifier 84 is connected to ground through a second potentiometer 86, the wiper contact 87 of which is connected to the input of a second high gain D.C. amplifier 88. The gain of amplifier 88 is similarly controlled by a feedback resistor 89, and the position of wiper contact 87 is for each operation manually set to introduce the incremental thickness of the layer. Thus, the output of amplifier 88 is equal to the product of K times $(Z_{k+1} - Z_k)$ provided feedback resistor 89 is properly chosen.

The output of D.C. amplifier 88 like amplifier 84 is connected to ground through a potentiometer 90, the wiper contact 91 of which is similarly connected as an input to a third high gain D.C. amplifier 92. D.C. amplifier 92 like amplifiers 84 and 88 has its gain controlled by a feedback resistor 93. Wiper contact 91 is manually positioned for each measurement to introduce the density contrast $\sigma_{ki}$ of the area to be scanned. Thus, the output of amplifier 92 which is connected to ground through potentiometer 94 is proportional to $K(Z_{k+1}-Z_k)\sigma_{ki}$.

The position of wiper contact 95 of potentiometer 94 is mechanically connected to the movement of slide arm 41 or a modified version of such slide arm as will be discussed more fully with reference to FIGURES 14–17 and thus introduces $(1-\cos\theta)$ such that the output tapped at wiper contact 95 is proportional to $$K(Z_{k+1}-Z_k)\sigma_{ki}(1-\cos\theta)$$

which is introduced as the input to a fourth D.C. amplifier 96 through a resistor 97 and a manually operated single-pole, single-throw switch 98. Amplifier 96 is connected as an integrating circuit by means of a feedback condenser 99, the time constant of which in connection with resistor 97 is chosen to control the rate of integration. The output of amplifier 96 is thus the integrand of the integral of Equation 11 which can be written $$\Delta G = \sum^m \sum^n \int_0^{2\pi} K(Z_{k+1}-Z_k)_i \sigma_{ki}(1-\cos\theta)_k i d\phi_{ki} \quad (12)$$

Equation 12 is more desirably written in the following form $$\Delta G \sum_{k=1}^{m} \sum_{i=1}^{n} \int_0^{2\pi} K(Z_{k+1}-Z_k)_i \sigma_{ki}(1-\cos\theta)_{ki}\frac{d\phi_{ki}}{dt} dt_i \quad (13)$$

where $t$ represents time. In this form the integrand can be conveniently used with the integrating circuit associated with feedback amplifier 96 and read directly by a high resistance volt meter 100 connected between the output of amplifier 96 and ground.

Thus, in measuring the $\Delta G$ of a particular area on a particular chart is commenced by closing switch 98 as the tracing operation begins. Meter 100 thus indicates the resulting integration and summation of Equation 13. Since the integrating circuit associated with amplifier 96 integrates with respect to time, it is necessary that the angle increases at a constant rate during the time that switch 98 is closed. To utilize this circuit a motor drive can be provided to turn angle $\phi$ at a constant rate, i.e., $$\frac{d\phi}{dt}$$

As the motor turns, pointer 27 should be maintained in contact with the contour. During this time, of course, switch 98 is closed.

Referring more particularly to FIGURES 14–17, a practical arrangement for carrying out the electrical computation operation is shown in FIGURES 14–17. The same reference numerals have been employed as were used in FIGURES 1–4 where the parts remain the same. Where the parts are nearly the same they are denoted by the superscript '.

Figure 14:
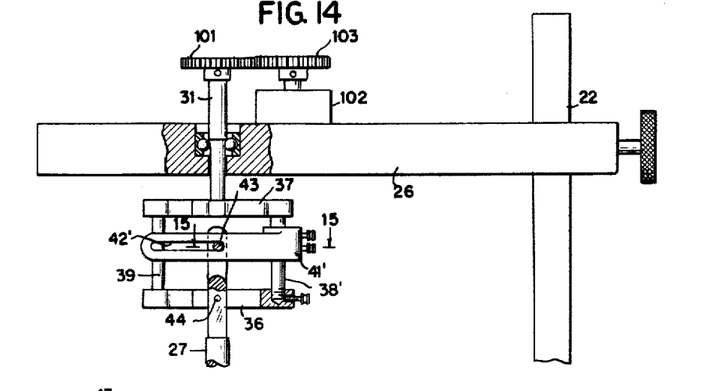
FIGURE 14 is a fragmentary elevation of a modification of the apparatus shown in FIGURES 1–4 for conversion to electrical computation.

Referring more particularly to FIGURE 14 the upper end of shaft 31 rather than being connected to a ball and disk integrator terminates in a spur gear 101. A motor 102 is mounted adjacent to shaft 31 on the upper surface of platform 26 and drives a spur gear 103 which meshes with spur gear 101 to rotate pointer 27.

Slide arm 41 of the original apparatus is replaced by a slide arm 41' which slides on a pin 38' replacing the original pin 38. Arm 41' extends horizontally between brackets 36 and 37 and terminates at its end remote from pin 38' between pins 39 and 40. The upper end of pointer 27 as in the arrangement of FIGURES 1–4 is slidably engaged in slot 42' of slide arm 41' by means of pin 43.

Figure 15:
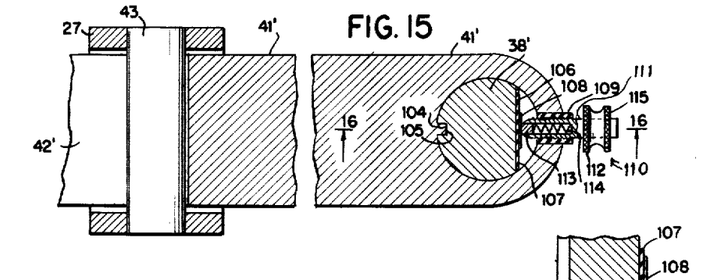
FIGURE 15 is an enlarged cross-section taken at line 15—15 in FIGURE 14.

Referring more particularly to FIGURE 15, it will be seen that pin 38' like pin 38 is slotted lengthwise as indicated by the reference numeral 104 to receive a lug 105 in the aperture in slide arm 41' which receives pin 38' and prevent axial rotation of slide arm 41' relative to pin 38'. On its side remote from slot 42' pin 38' is provided with a flat 106 which is covered by an adherent film 107 of dielectric material, on the exterior face of which there is provided a carbon resistance coating 108.

The end of slide arm 41' adjacent to flat 106 (see also FIGURE 16) is apertured to receive in fixed engagement a bushing 109 of hard dielectric material in which an electrical terminal 110 is threadedly engaged. Terminal 110 includes a threaded, axially bored screw 111 having a radial flange 112 positioned intermediately of its ends. One end of screw 111, in which its axial bore opens, slidably receives a carbon plug 113 which is loaded by an internal spring 114 and threadedly engages bushing 109 causing carbon plug 113 to wipe against carbon coating 108 on pin 38'. Thus, an electrical contact is made between terminal 110 and carbon coating 108 which is otherwise electrically insulated from the surrounding structure. The outer end of screw 111 is provided with a suitable nut 115 to permit external electrical connections to be made between nut 115 and flange 112.

Figure 16:
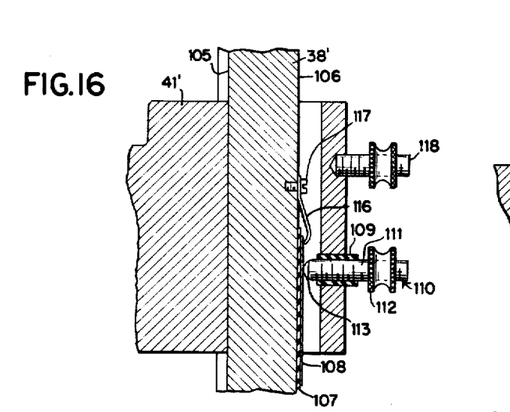
FIGURE 16 is a vertical section taken at line 16—16 in FIGURE 15.
Figure 17:
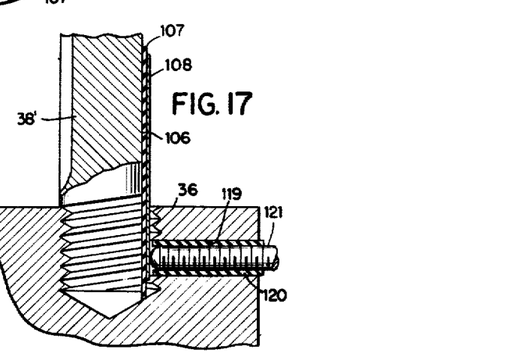
FIGURE 17 is an enlarged vertical section of a portion of the apparatus shown in FIGURE 14.

Referring more particularly to FIGURE 16 which shows slide arm 41' at almost its uppermost position on pin 38', it will be observed that coating 108 is terminated beneath the upper end of pin 38' as also is dielectric film 107. A small spring clamp 116 which at one end is held tightly against the bare portion of flat 106 by means of a small screw 117 makes sharp contact with the upper end of carbon resistance coating 108, thus effectively grounding that end of coating 108. The location of the contact of clamp 116 with coating 108 is arranged such that when arm 41' is at its highest position, carbon plug 113 will just contact the end of clip 116 where it contacts coating 108.

An electrical terminal screw 118 is provided adjacent to terminal 110 for making an electrical ground connection to arm 41'. Thus, as arm 41' is lowered on pin 38' by movement of pointer 27 outwardly from the vertical, the resistance of coating 108 effectively connected by the terminals 110 and 118 is a function of $1-\cos\theta$. Accordingly, it will be apparent that carbon coating 108 can be employed in the circuit of FIGURE 13 in place of potentiometer 94 with terminal 110 replacing wiper contact 95.

In order to make an appropriate connection to the output of D.C. amplifier 92, the lower end of carbon coating 108 is terminated above the bottom of pin 38' where this threadedly is engaged in lower bracket 36. Bracket 36 is bored horizontally from its right end (see FIGURE 17) as indicated by the reference numeral 119, such that the axis of bore 119 coincides with a horizontal plane through the axis of pivot pin 44. Bore 119 is lined with a hard dielectric sleeve 120 into which a terminal screw 121 similar to terminal screw 118 is threadedly engaged with its inner end in solid contact with carbon coating 108.

As will be evident, the modifications of FIGURES 14–17 provide the necessary electrical connections to permit operation of device 20 employing an electrical computer such as that of FIGURE 13. As noted above, however, the angular movement of pointer 27 with respect to the vertical axis must be at a constant rate. Since the contour will vary irregularly, some difficulty will be experienced in causing the lower tip of 27a of pointer 27 to follow all the irregular portions of a given contour line. For more refined operation a modification of the circuit of FIGURE 13 can be employed as suggested by FIGURE 18 in which the same reference numerals are employed to indicate identical parts.

Figure 18:
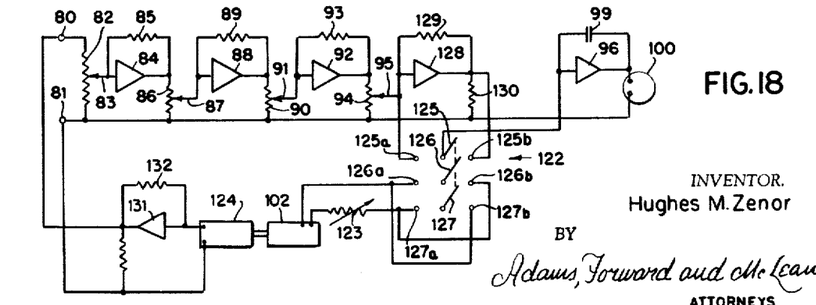
FIGURE 18 is a schematic electrical diagram showing a modification of the arrangement of FIGURE 13 providing more refined computation.

In the circuit arrangement of FIGURE 18, switch 98 is replaced by a double throw arrangement to permit reversing the output of amplifier 92 so that either plus or minus voltage can be applied to intergrating amplifier 96 corresponding to whether the angle $\phi$ is increasing or decreasing. Actually, a triple-pole, double-throw switch 122 is employed to control starting and stopping of motor 102 as well as the direction of rotation. Since it is desirable to have the angle $\phi$ change at different speeds to assist the operator in following a contour, a speed control 123 for motor 102 has been added. Since this will introduce a variable speed resulting in a non-constant $$\frac{d\phi}{dt}$$

of Equation 13, a tachometer 124 is added to supply an input to terminals 80, 81 proportional to $$\frac{d\phi}{dt}$$

More specifically, switch 122 includes three poles, 125, 126 and 127 which are ganged together and are arranged simultaneously to contact three sets of contacts, 125a, 126a and 127a or an alternate set of three contacts, 125b, 126b and 127b. Contact 125a and pole 125 when closed cause operation of the circuit of FIGURE 18 in the same manner as in the case of FIGURE 13. In order to provide reverse polarity, an additional D.C. amplifier 128 is provided which is connected to wiper contact 95 as an input and which is provided with a feedback resistor 129 holding the gain of amplifier 128 to unity. The output of amplifier 128 which is decoupled from ground by means of resistor 130 is of opposite polarity to the output of amplifier 92 tapped by contact 95, but otherwise equal to such output, and is connected to contact 125b. Thus, depending upon the position of pole 125, a voltage of equal magnitude but opposite polarity can be introduced to intergrating amplifier 96.

Contacts 126a and 127b are connected together and contacts 127a and 126b are connected together in series with a power supply for motor 102 and control resistor 123. Thus, the direction of rotation of motor 102 and hence of pointer 27 is also controlled by the position of switch 122.

The output of tachometer 124 is connected to terminals 80, 81 through a suitable high-gain D.C. amplifier 131, the gain of which is controlled by a feedback resistor 132. Thus, as the operator adjusts resistor 123, the proportionality voltage introduced at terminals 80, 81 is varied with the speed of rotation of pointer 27 and hence is correlated with $$\frac{d\phi}{dt}$$

With these additions the input to integrating amplifier 39 is proportional to $$K(Z_{K+1}-Z_K)\sigma_{Ki}(1-\cos\theta)_{Ki}\frac{d\phi_{Ki}}{dt} \quad (14)$$

and when the time switch 122 is closed will be proportional to $dt$. The integration called for in Equation 13 thus can be performed.

From the preceding description, it will be apparent that many possible changes can be made in carrying out the method of my invention, for example, in the selection of thickness and dip of the layers. It will also be apparent that the apparatus for measuring the solid angle of various areas on the charts can be varied. Polar planimeter curve followers can be employed in place of manual operation of pointer 27. Indeed, even scanning by a beam of light can be employed.

I claim:

A method for deriving information useful in the preparation of synthetic gravity maps having an assumed distribution of earth subsurface density which includes preparing a series of charts representing contiguous layers of said subsurface having incremental thickness on which are marked contour lines indicating the density distribution in such layers thereby dividing each chart into a plurality of areas, each having approximately uniform density, positioning each such chart transversely to a preselected axis and spaced in an axial direction in proportion to the scale of the chart with respect to a point on said axis removed from said chart corresponding to a station on the surface of the earth where a gravity measurement is to be indicated on the synthetic gravity maps, said areas thereby each subtending solid angles relative to said point, measuring each of such solid angles, and summing all such solid angle measurements made relative to such point in each case multiplied by its scale factor, the density represented by the area subtending such angle and the incremental thickness of such area, whereby the effect of the assumed subsurface density distribution upon gravity measured at said station is represented by such summation.

References Cited in the file of this patent

UNITED STATES PATENTS

| | | |
|---|---|---|
| 1,129,872 | Keeler | Mar. 2, 1915 |
| 1,170,721 | Airey | Feb. 8, 1916 |
| 2,787,417 | Northrup et al. | Apr. 2, 1957 |
| 2,801,794 | Garvin et al. | Aug. 6, 1957 |
| 2,858,069 | Garvin | Oct. 28, 1958 |
| 2,871,088 | Abell | Jan. 27, 1959 |
| 2,918,213 | Gerber | Dec. 22, 1959 |
| 2,951,736 | Black | Sept. 6, 1960 |

FOREIGN PATENTS

| | | |
|---|---|---|
| 313,157 | Great Britain | May 16, 1929 |
| 330,687 | Great Britain | June 19, 1930 |

UNITED STATES PATENT OFFICE
CERTIFICATE OF CORRECTION

Patent No. 3,082,943                        March 26, 1963

Hughes M. Zenor

It is hereby certified that error appears in the above numbered patent requiring correction and that the said Letters Patent should read as corrected below.

Column 2, line 37, for "may" read -- my --; column 7, line 37, for "de" read -- d$\phi$ --; column 9, line 21, for that portion of equation (12) reading $$\sum_{}^{m}\sum_{}^{n} \text{ read } \sum_{k=1}^{m}\sum_{i=1}^{n}$$

column 11, line 51, equation (14), for "$K_j$", each occurrence, read -- $K_i$ --.

Signed and sealed this 5th day of November 1963.

(SEAL)
Attest:

ERNEST W. SWIDER
Attesting Officer

EDWIN L. REYNOLDS
Acting Commissioner of Patents